United States Patent [19]
Nelimarkka

[11] 3,982,727
[45] Sept. 28, 1976

[54] FLANGELESS VALVE

[75] Inventor: Juha Antti E. Nelimarkka, Helsinki, Finland

[73] Assignee: Neles Oy, Finland

[22] Filed: Dec. 27, 1974

[21] Appl. No.: 536,990

Related U.S. Application Data

[63] Continuation of Ser. No. 350,490, April 12, 1973, abandoned.

[30] Foreign Application Priority Data

Apr. 12, 1972 Finland .............................. 1036/72

[52] U.S. Cl. ............................ 251/152; 137/454.2;
251/151; 251/315; 251/367; 285/325
[51] Int. Cl.² ..................................... F16L 29/00
[58] Field of Search .......... 251/315, 309, 148, 150,
251/151, 367, 152, 305, 304, 62, 63.4;
285/325, 405, 412; 137/454.2, 515.7, 798

[56] References Cited
UNITED STATES PATENTS

| | | | |
|---|---|---|---|
| 1,796,159 | 3/1931 | Pallady | 285/412 |
| 1,900,561 | 3/1933 | Junggren | 285/405 |
| 2,895,496 | 7/1959 | Sanctuary | 137/315 |
| 2,992,655 | 7/1961 | Davis | 137/454.2 |
| 2,998,223 | 8/1961 | Baxter | 251/62 |
| 3,023,783 | 3/1962 | Vickery | 251/315 |
| 3,348,804 | 10/1967 | Piccardo | 251/214 |
| 3,367,359 | 2/1968 | Johnson | 251/315 |
| 3,561,730 | 2/1971 | Hurst | 251/315 |
| 3,583,668 | 6/1971 | Nelimarkka | 251/151 |

*Primary Examiner*—William R. Cline
*Assistant Examiner*—H. Jay Spiegel
*Attorney, Agent, or Firm*—Cushman, Darby & Cushman

[57] ABSTRACT

The flangeless valve is disposed between flange bolts of adjacent pipe flanges. The valve comprises a body which has two parts, a closing element rotatably mounted within the body and seat rings mounted in ring-shaped transverse grooves machined in both sides of the body. The valve body diameter is small enough so that the valve may be placed in the pipeline, between flange bolts of the pipe flanges. Most bolts do not contact the valve body and pass through holes in the pipe flanges; other fasteners are attached to a frame on the valve through the flanges thereby transmitting the bolt clamping force. One body construction can use a circumferential seal between the body halves in the body joint. Such seal ends at the shaft and a ring-shaped seal is located in a plane perpendicular to the circumferential seal and presses against its ends with a tightenable bushing.

2 Claims, 12 Drawing Figures

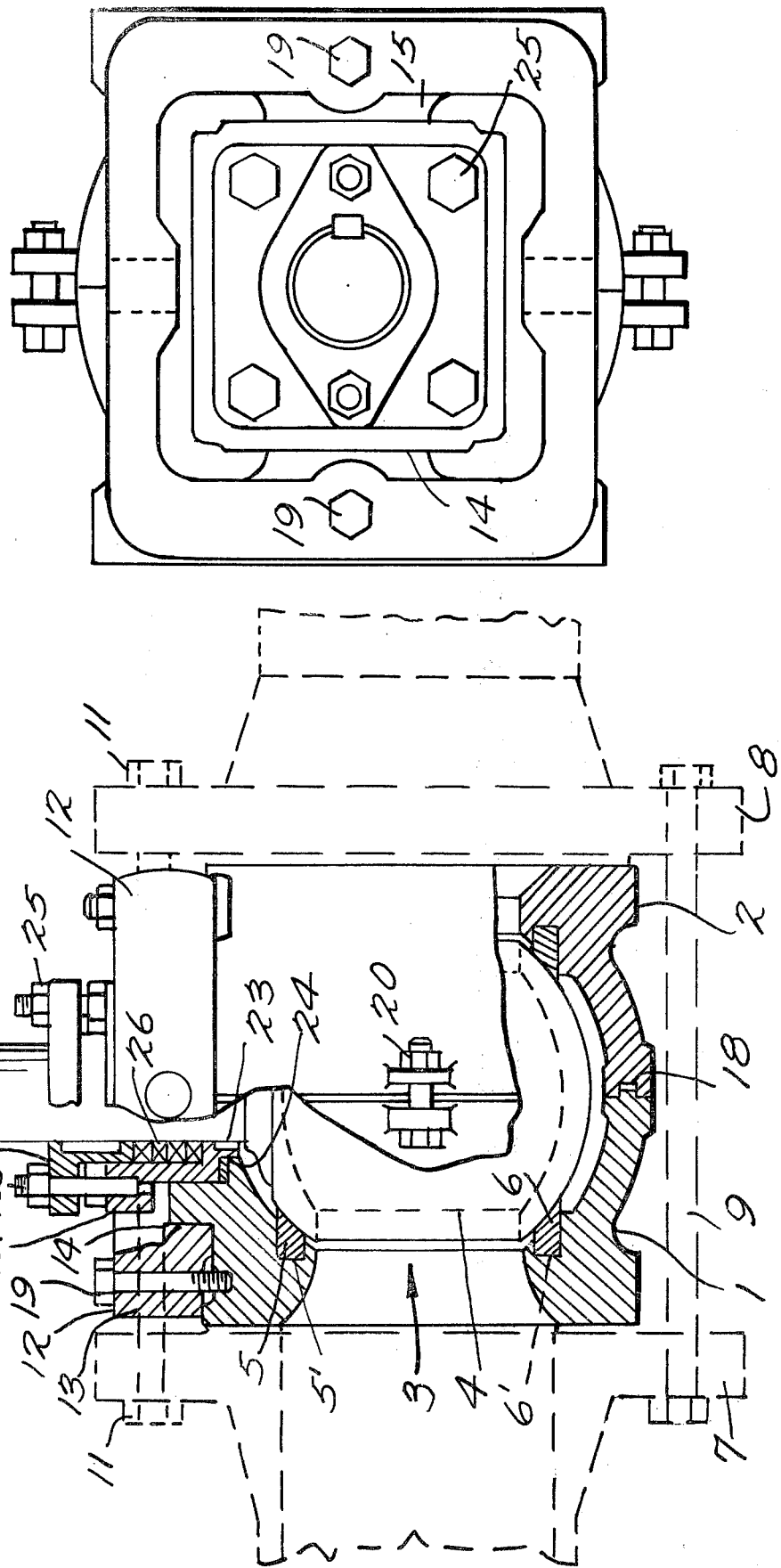

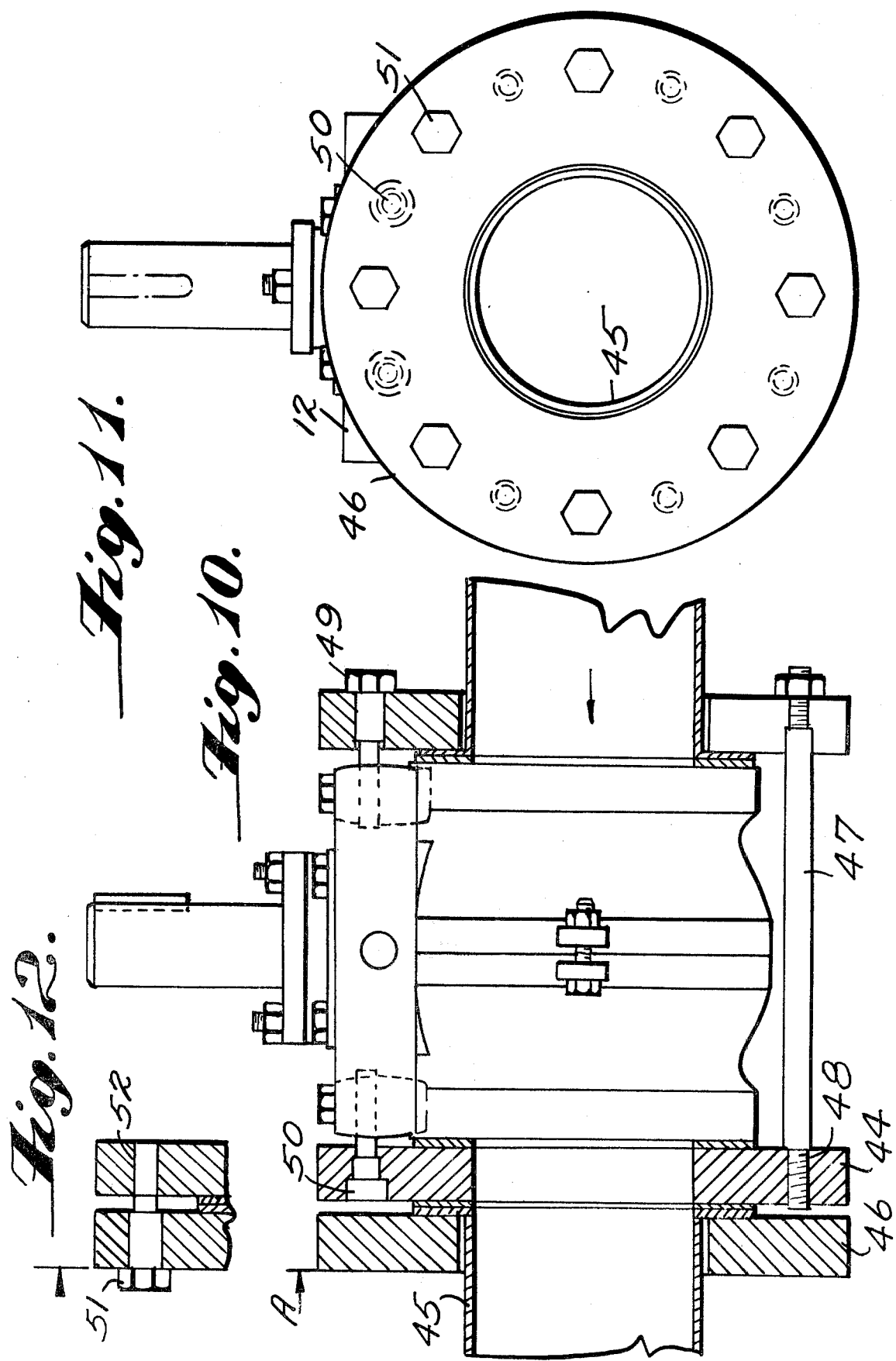

FLANGELESS VALVE

This application is a continuation of application Ser. No. 350,490, filed Apr. 12, 1973, now abandoned.

The present invention relates to a valve and more particularly to a frame and means to support the flangeless valve between pipe segments.

A ball valve usually has a flow channel in its body and comprises a rotatable closing element, which is generally spherical or in the form of a segment of a sphere or cylinder, and on each side of it, seat rings lying in ring-shaped transverse grooves machined in the body.

A ball valve is, in general, equipped with connecting elements like flanges, welded ends or screw threads. It is also known to use a valve which itself has no flanges but the valve is mounted between pipe flanges which are tightened together by pipe flange bolts as evidenced by U.S. Pat. Nos. 3,082,992 and 3,428,292. This kind of construction is used in small nominal sizes when only four pipe flange bolts are needed. If more than four bolts are needed, it is difficult to fit the valve or ball shaft between the bolts, particularly if it requires a larger diameter, due to high working pressure.

It is known, furthermore, that the ball can be rigidly connected to the shaft, or floating, i.e., connected to the shaft with a link allowing the ball to move against the downstream seat, the shaft being stationary in this case. The disadvantage of this valve type is that the connection becomes loose with time, which causes inaccuracy, not only in control applications but also in the open and closed positions when applied to shut-off valves.

A disadvantage of the prior art ball valve types which concerns particularly larger sizes is their heavy construction and, consequently, the high price. This is an obvious inconvenience, especially when the valve is made of corrosion-resistant or other special steel grades. Furthermore, various pressure ratings have usually required different valves, due to the differences in the pipe connections. Because of different wall thicknesses of valve bodies, it has also been more economical to have different valves for low and high pressure ratings.

SUMMARY OF THE INVENTION

One characteristic feature of the present invention is the small body diameter of the valve enabling the mounting of the valve into a pipeline, in the space btween the flange bolts, so the valve itself, therefore, needs no flanges. Some or most of the pipe flange bolts do not contact the valve body while some of the bolts are fastened to a special frame or frames transmitting the bolt clamping force. Another feature that is desirable, but not essential, resides in the fact that the valve body is divided into two symmetrical body halves, having a body joint in the middle of the valve in a plane transverse to the flow. The circumferential seal, which is between the body halves in the body joint, ends at the shaft of the valve so that a ring-shaped seal is tangent to the outer ends of the circumferential seal and presses against them by means of a tightenable bushing.

It is noted that by using a frame, the valve body in the present invention can be divided into two symmetrical body halves so that the body joint between them is in the middle of the valve when the ball and shaft, preferably of one piece, is placed into the halve. This would not be possible without a frame as the screws now fastened to the frame could not alternatively be fastened to the valve body.

In other words, the invention provides a flangeless valve designed for securement between two, axially spaced pipe flanges, each of which has a ring of a plurality of angularly spaced bolt holes proceeding axially therethrough, with these bolt holes on one flange being in axial alignment with corresponding ones of these bolt holes on the other flange so that respective long bolts could be installed and secured between each respective pair of axially aligned bolt holes on the two flanges and tightened to draw the two flanges axially towards one another, the spaces occupied by such bolts between the flanges thus defining a plurality of mutually parallel long bolt paths. The flangeless valve is a rotary valve having a body with an inlet and outlet at axially opposite ends thereof on respective upstream and downstream sealed together, halves of said body and with a valve actuator shaft projecting radially outwardly from the body intermediate these ends;

the body having an exterior size and shape of such small diameter that, upon being axially aligned and centered between said flanges, all but a minority of said long bolt paths will remain unoccupied by the valve and that said minority which is obstructed is located angularly adjacent where the valve actuator shaft projects from the body;

the body further including: means defining a radially outwardly facing support surface on said body halves, ringing said shaft; a ring shaped frame supported upon the support surface; fastener means removably securing said frame in place upon said support surface;

for at least one said obstructed long bolt path, a pair of openings through said frame, each such pair of openings being in axial alignment with one another on a respective one said obstructed long bolt path, whereby, when the valve is installed between said pipe flanges, long bolts may be installed and tightened between said pipe flanges along the unobstructed long bolt paths, and short bolts may be installed and tightened between the respective frame openings and flange openings on said at least one obstructed long bolt path.

Owing to the circumferential seal design, the ball and shaft can be integrally cast and the body joint may be in the middle of the valve, so the body halves are of the same shape and the body joint between them is absolutely tight.

An actuator for the valve may be fastened with special pins to the frame, the torque being effectively opposed and transmitted to the pipeline screws which are connected to the frame, while swinging of the ball is allowed.

Some of the most prominent advantages of the valve of the present invention are its lightness and short face-to-face length and, consequently, a lower price than prior art valves. The weight of the valve is at a minimum, which is of great importance, particularly when the valve is made of expensive materials. One valve can be used for several different pressure ratings by assuring that the screw hles are drilled and threaded in the frame according to each particular rating. The wall thickness of the valve body is, naturally, to be dimensioned according to the highest pressure allowed, but the wall area is very small. Whatever the valve body material, the frame can always be made from a cheaper material. When mounting between pipe flanges, no fastening screws are needed in the joint between the body halves as the seal between them is pressed simultaneously when the pipe flange bolts are tightened. However, maintaining the valve together for easy mounting requires two small screws for convenience, but they are not necessary for the proper operation of the valve. Fastening of the actuator does not prevent the ball from swinging because the mounting brackets therefor are fastened to special pins located in the body. The elastic seal of the shaft allows twisting of the brackets at the swing of the ball shaft.

The flangeless valve is disposed between flange bolts of adjacent pipe flanges. The valve comprises a body which has two parts, a closing element rotatably mounted in the body, and seat rings mounted in ring-shaped transverse grooves machined in both sides of the body. The valve body is small enough so that the valve may be placed in the pipe-line, between flange bolts of the pipe flanges. Some or most bolts do not contact the valve body and pass through holes in the pipe flanges; other fasteners are attached to a frame in the valve through the flanges thereby transmitting the bolt clamping force. One body construction can use a circumferential seal between the body halves in the body joint. In this case, the seal ends at the shaft and a ring-shaped seal is located in a plane perpendicular to the circumferential seal and presses against its ends with a tightenable bushing.

For a better understanding of the present invention together with further objects thereof, reference is directed to the following description, taken in connection with the accompanying drawing.

DESCRIPTION OF THE DRAWINGS

FIG. 1 represents the ball valve seen from one side, partly in section;

FIG. 2 is the same ball valve seen from direction A—A in FIG. 1;

FIGS. 10–12 show the valve of the present invention employing an additional flange.

DESCRIPTION OF THE PREFERRED EMBODIMENTS

Figure 3:
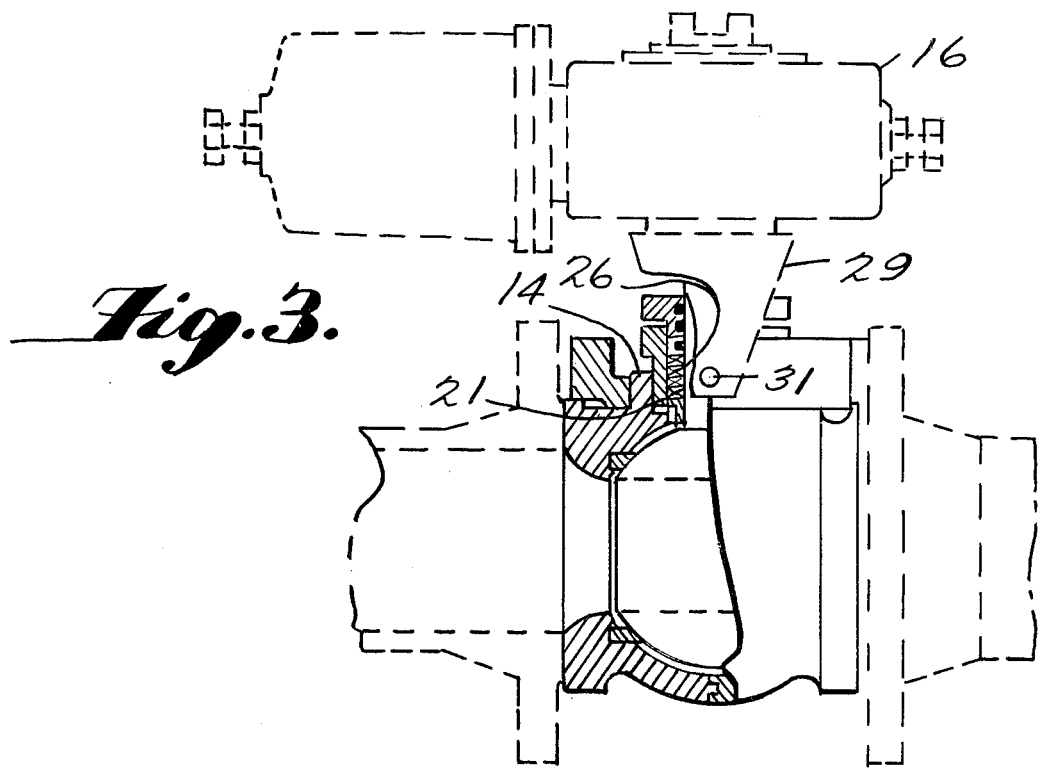
FIG. 3 is the combination of the valve of FIG. 1 with an actuator.

The valve body of the ball valve shown in FIG. 1 consists of two halves, 1 and 2, each having a flow channel 3. On both sides of the closing element ball 4 are seat rings 5 and 6 which lie in ring-shaped longitudinal grooves 5' and 6', respectively, machined in the body. Neither one of the body halves 1 and 2 has a flange which would correspond to the pipe flanges 7 and 8 which are joined with long stud bolts 9. The stud bolts 9 do not contact the valve body because the diameter of the flow channel 3 is smaller than the inner diameter of pipe flanges 7 and 8, thus allowing the outer diameter of the valve body to avoid contact with stud bolts 9.

The shape of the entry 3 from the pipe bore to the ball valve is important for the highest capacity operation of the present invention. If it is in the shape of a cone, the fluid contracts after it leaves the small diameter of the cone, inside the ball, and the capacity is reduced. If the entry is in the shape of a curve, the fluid flows around the curve more easily, and does not contract as much inside the ball, and the flow capacity is higher. The preferred shape giving the maximum flow capacity is one-quarter of an ellipse or a shape closely approximating an ellipse, as shown in FIG. 1. The capacity of the elliptical entry is about one-third greater than a cone-shaped ball bore with the same diameter.

Generally only four stud bolts are needed to adequately support the valve between the pipe segments. For larger pipe sizes and higher pressure ratings, requiring more than four bolts, the long stud bolts 9 which would come nearest shaft 10 of ball 4 are replaced by short stud bolts or hexagon screws 11 which are fastened into threaded holes 13 in special frame 12. This allows the valve to fit between various pipe flanges when the necessary threaded holes 13 are drilled into frame 12 in the correct places.

In principle, frame 12 could be quite loose from the valve body, but to make sure that it is disposed accurately in its place, it is supported against surfaces 14 and 15 in the valve body. Therefore, should screws 11 be unevenly tightened, the frame 12 would not move from its place. This is important as actuator 16, see FIG. 3, also is fastened to the frame. Furthermore, frame 12 is fastened to the valve body with screws 19 so the equipment is easier to handle.

In a preferred form of the valve involved, all 4 and shaft 10 are integrally cast and fitted between body halves 1 and 2.

The valve requires no special bolt flange for tightening seal 18 because, when the valve is fastened between the pipe flanges, the joint at circumferential seal 18 is tightened at the same time. For convenience of handling, body halves 1 and 2 are connected with two small bolts 20.

The higher the nominal pressure, the higher the pressure against seal 18, since stud bolts 9 and bolts 11 depend both on the pipe flanges and on the nominal pressure rating. Seal 18 thus puts virtually no limit on the use of the valve in a wide range of pressure ratings.

Figure 5:
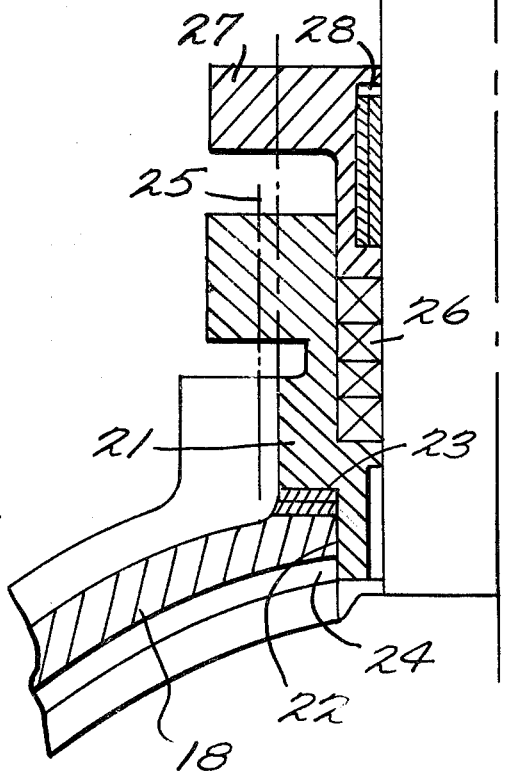
FIG. 5 illustrates the seats tangent to each other, seen from a vertical angle in regard to the body joint.

Seal 18 lies in a groove between body halves 1 and 2 which prevent it from moving even at high tightening pressures. As shown in FIG. 5, seal 18 ends against bushing 21 by the shaft 10 although a small split might remain between end 22 of seal 18 and bushing 21. The seal is maintained at end 22 by a ring-shaped seal 23, which, through tightenable bushing 21 is pressed against seal 18. A shoulder 24 prevents seal 18 from moving from its place when the ring-shaped seal 23 is tightened. Seals 18 and 23 can be formed of any suitable material such as resilient rubber, plastic, metal or a material containing asbestos.

Bushing 21 is shaped so that it opposes air produced at the tightening of shaft packing 26 which prevents the tightening force from opening the seal 18 between the body halves. Bushing 21 is fastened to the valve body with screws 25, with closing element ball 4 being in a position where the flow opening is crosswise in regard to the pipe, i.e., when the valve is closed. The pressure of the medium in the pipe presses ball 4 against downstream side of seat 6. The ball movement due to the pressure of the medium is very slight since only a small clearance is needed between ball 4 and seats 5 and 6 to accommodate the different expansion rates between the ball 4 and the valve body upon contact with warm mediums.

The ball movement in the direction of flow makes shaft 10 turn slightly to a slanted position, and this movement is called swinging of the ball. This movement occurs since shaft packing 26 is soft and elastic and the inner hole of bushing 21 and tightening bushing 27 has a small clearance with the shaft 10. Bearing 28 of tightening bushing 27 is also elastic. The swinging fulcrum is located in the shaft packing 26. An important feature in the construction is that the actuator 16, which is fastened to the shaft 10 as shown in FIG. 3, does not prevent this small swinging movement. Therefore, actuator 16 is fastened to frame 12 by means of bracket 29 and bearing pin 31 and a corresponding bracket and pin not shown. The bearing pins are located at the swinging fulcrum of ball 4, according to FIG. 3, to enable the brackets in response to the swing of ball 4 to turn about the bearing pins easily. The brackets transmit the torque from the actuator through the bearing pins to the frame and further to the valve body through surfaces 14 and 15. Bolts 11 are fastened to the frame and assist in transmitting the torque.

Figure 4:
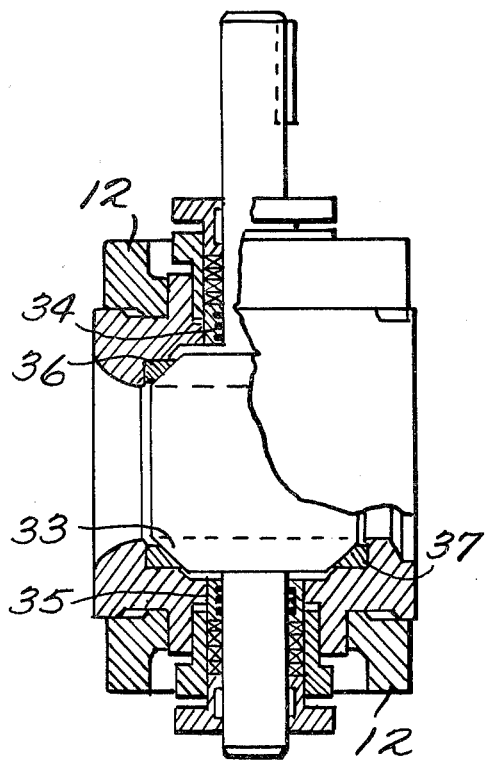
FIG. 4 is a different construction of the valve with the ball supported by a shaft on both sides.

FIG. 4 represents another type of arrangement wherein ball 33 is supported by bearings 34 and 35 on each side. In this embodiment, no swinging takes place, but seats 36 and 37 must be of such material that the flowing medium, and optionally mechanical springs, press the seats against ball 33 to prevent leakage of the medium. Since this embodiment has shafts on each side of the ball, two frames 12 are required.

Figure 6:
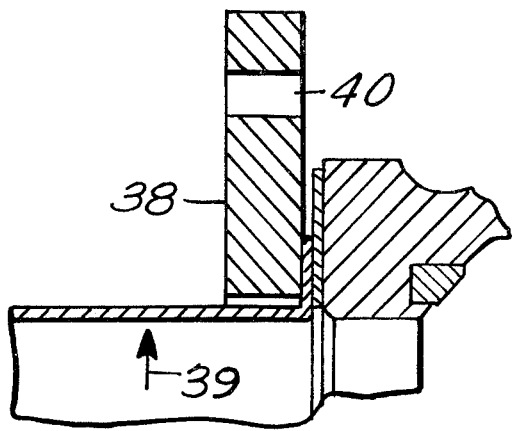
FIGS. 6–9 show some alternatives for the mounting of the valve to the pipeline.

The valve construction according to this invention allows the use of a reduced valve size in comparison with the nominal pipe size. Certain alternative constructions, as shown in FIG. 6, also allow mounting to a pipeline having its inner diameter equal to the valve flow opening. Here, special flange 38 has a bolt circle diameter 39 of one nominal size larger than would be normally required for flange drilling 40. Two flanges 38 can be provided with the valve so they can be considered to be part of the valve construction.

Figure 7:
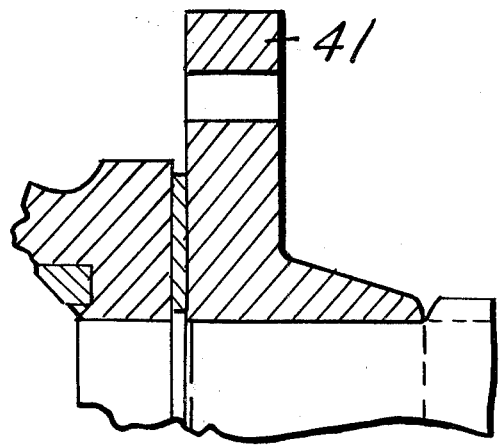
Figure 8:
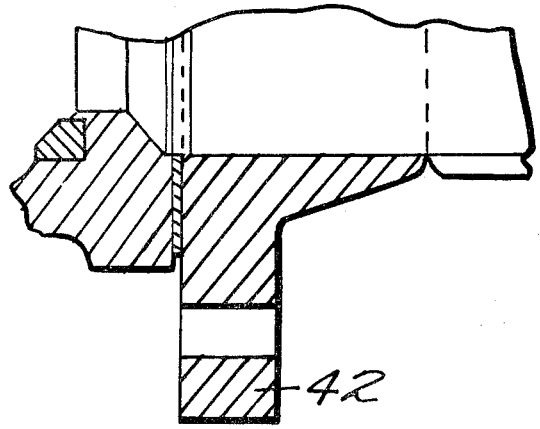

FIG. 7 represents another mounting embodiment for a full-port valve to be welded in the pipeline. Flange 41 is similar to flange 38 except that it is welded at its end. FIG. 8 shows how the valve is mounted with normal pipe flanges 42 equipped with welded ends. According to the FIG. 1 design, the flow port is reduced, i.e., one nominal size smaller than the pipe's inner diameter.

Figure 9:
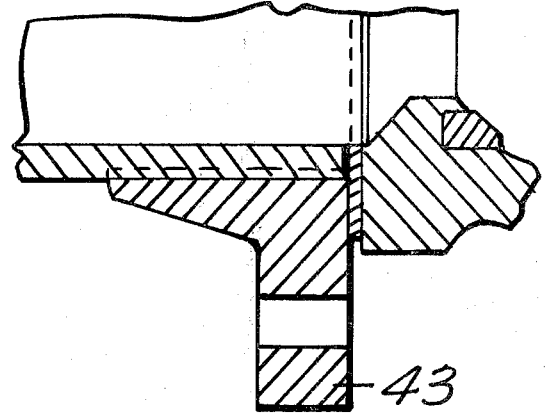

Another embodiment is shown in FIG. 9. Instead of pipe flanges 7 and 8, it has flanges 43 with thread connections for the pipe. The flange 43 can, naturally, have either inner or outer threads and be dimensioned either for a full-port valve or a reduced one.

The construction represented in FIGS. 10–12 is intended for applications where the pipe following the valve has to be easily detachable from the valve while still holding the inlet pressure. The valve of the present invention then has an additional flange 44, to enable detachment of pipe 45 on the downstream side of the valve, and flange 46, to enable the valve to remain attached to the upstream segment of pipe and hold the pressure. Stud bolt 47 is fixed to the additional flange 44, and screw 49 is replaced by a screw 50 whose head is sunk into the flange. Pipe flange 46 and additional flange 44 are fastened to each other with screws 51 through threads 52 in additional flange 44, as seen from FIG. 12.

The invention is naturally not limited to these examples, and the details may vary considerably within the limits of the claims.

What is claimed is:

1. For securement between two, axially spaced pipe flanges, each of which has a ring of a plurality of angularly spaced bolt holes proceeding axially therethrough, with these bolt holes on one flange being in axial alignment with corresponding ones of these bolt holes on the other flange so that respective long bolts could be installed and secured between each respective pair of axially aligned bolt holes on the two flanges and tightened to draw the two flanges axially towards one another, the spaced occupied by such bolts between the flanges thus defining a plurality of mutually parallel long bolt paths:

a flangeless rotary valve having a body with an inlet and outlet at axially opposite ends thereof on respective upstream and downstream sealed together, halves of said body and with a valve actuator shaft projecting radially outwardly from the body intermediate these ends;

the body having an exterior size and shape of such small diameter that, upon being axially aligned and centered between said flanges, all but a minority of said long bolt paths will remain unoccupied by the valve and that said minority which is obstructed is located angularly adjacent where the valve actuator shaft projects from the body;

the body further including: means defining a radially outwardly facing support surface on said body halves, ringing said shaft; a ring shaped frame supported upon the support surface; fastener means removably securing said frame in place upon said support surface;

for at least one said obstructed long bolt path, a pair of openings through said frame, each such pair of openings being in axial alignment with one another on a respective one said obstructed long bolt path, whereby, when the valve is installed between said pipe flanges, long bolts may be installed and tightened between said pipe flanges along the unobstructed long bolt paths, and short bolts may be installed and tightened between the respective frame openings and flange openings on said at least one obstructed long bolt path.

2. A valve construction, comprising:

two, axially spaced pipe flanges, each of which has a ring of a plurality of angularly spaced bolt holes proceeding axially therethrough, with these bolt holes on one flange being in axial alignment with corresponding ones of these bolt holes on the other flange so that respective long bolts could be installed and secured between each respective pair of axially aligned bolt holes on the two flanges and tightened to draw the two flanges axially towards one another, the spaces occupied by such bolts between the flanges thus defining a plurality of mutually parallel long bolt paths;

a flangeless rotary valve having a body with an inlet and outlet at axially opposite ends thereof on respective upstream and downstream sealed together, halves of said body and with a valve actuator shaft projecting radially outwardly from the body intermediate these ends;

the body having an exterior size and shape of such small diameter that, upon being axially aligned and centered between said flanges, all but a minority of said long bolt paths will remain unoccupied by the valve and that said minority which is obstruced is located angularly adjacent where the valve actuator shaft projects from the body;

the body further including: means defining a radially outwardly facing support surface on said body halves, ringing said shaft; a ring shaped frame supported upon the support surface; fastener means removably securing said frame in place upon said support surface;

for at least one said obstructed long bolt path, a pair of openings through said frame, the openings of each such pair of openings being in axial alignment with on another on a respective one said obstructed long bolt path, said valve being installed between said pipe flanges;

a respective plurality of long bolts being installed and tightened between said pipe flanges along the respective unobstructed long bolt paths; and a respective plurality of short bolts installed and tightened between the respective frame openings and flange openings on said at least one obstructed long bolt path, each short bolt thus passing between only one pipe flange and the frame.

* * * * *